(12) United States Patent
Stewart

(10) Patent No.: US 7,673,136 B2
(45) Date of Patent: Mar. 2, 2010

(54) METHOD FOR SECURE MULTICAST REPEATING ON THE PUBLIC INTERNET

(76) Inventor: Ian A. Stewart, 4125 Market St., Suite 19, Ventura, CA (US) 93003

( * ) Notice: Subject to any disclaimer, the term of this patent is extended or adjusted under 35 U.S.C. 154(b) by 1452 days.

(21) Appl. No.: 10/085,524

(22) Filed: Feb. 26, 2002

(65) Prior Publication Data

US 2003/0163690 A1 Aug. 28, 2003

(51) Int. Cl.
  *H04L 29/00* (2006.01)
  *H04L 29/06* (2006.01)
(52) U.S. Cl. .................... 713/163; 713/150; 713/162; 713/168; 709/245; 709/225; 709/229
(58) Field of Classification Search ................. 713/163
  See application file for complete search history.

(56) References Cited

U.S. PATENT DOCUMENTS

| | | | | |
|---|---|---|---|---|
| 5,548,646 | A * | 8/1996 | Aziz et al. ................... | 713/153 |
| 5,748,736 | A * | 5/1998 | Mittra ......................... | 713/163 |
| 6,006,267 | A * | 12/1999 | Nguyen et al. .............. | 709/227 |
| 6,049,878 | A * | 4/2000 | Caronni et al. ................ | 726/3 |
| 6,169,741 | B1 * | 1/2001 | LeMaire et al. ............. | 370/401 |
| 6,223,286 | B1 * | 4/2001 | Hashimoto .................. | 713/178 |
| 6,233,017 | B1 * | 5/2001 | Chaddha ................ | 375/240.12 |
| 6,240,188 | B1 * | 5/2001 | Dondeti et al. .............. | 380/284 |
| 6,263,435 | B1 * | 7/2001 | Dondeti et al. .............. | 713/163 |
| 6,330,671 | B1 * | 12/2001 | Aziz ........................... | 713/163 |
| 6,453,469 | B1 * | 9/2002 | Jystad ......................... | 717/174 |
| 6,567,929 | B1 * | 5/2003 | Bhagavath et al. ............ | 714/18 |
| 6,584,566 | B1 * | 6/2003 | Hardjono ..................... | 713/163 |
| 6,606,706 | B1 * | 8/2003 | Li ............................... | 713/162 |
| 6,643,773 | B1 * | 11/2003 | Hardjono ..................... | 713/153 |
| 6,707,796 | B1 * | 3/2004 | Li ................................ | 370/254 |
| 6,862,684 | B1 * | 3/2005 | DiGiorgio .................... | 713/163 |
| 6,901,510 | B1 * | 5/2005 | Srivastava .................... | 713/163 |
| 2002/0061029 | A1 * | 5/2002 | Dillon ......................... | 370/432 |
| 2003/0163690 | A1 * | 8/2003 | Stewart ....................... | 713/163 |

OTHER PUBLICATIONS

A V6 Under the Hood: IPv6 for Embedded Systems (1998) Margaret Wasserman http://citeseerx.ist.psu.edu/viewdoc/summary?doi=10.1.1.42.1003.*

* cited by examiner

*Primary Examiner*—Syed A. Zia
(74) *Attorney, Agent, or Firm*—Black Lowe & Graham PLLC

(57) ABSTRACT

A system and method for sending a secure multicast transmission. The system includes a computer system coupled to a public network and configured to generate a multicast broadcast, and encrypt the generated multicast broadcast. The system also includes a router coupled to the public network, and a user system configured to request to join a multicast broadcast, wherein the user system is associated with the router. The router is configured to retrieve the encrypted multicast broadcast from the computer system over the public network, decrypt the sent multicast broadcast, and send the decrypted multicast broadcast to the user system requesting to join.

3 Claims, 7 Drawing Sheets

METHOD FOR SECURE MULTICAST REPEATING ON THE PUBLIC INTERNET

FIELD OF THE INVENTION

This invention relates to systems and methods for transmission of data on the Internet.

BACKGROUND OF THE INVENTION

A Multicast broadcast is an Internet broadcast with a "Class D" address. The devices that route information in the Internet (routers) recognize a Class D address as a Multicast and forward the Multicast data to requesters of the Multicast. The result is that Multicast saves Internet bandwidth by sharing the information as needed. Multicasting makes the multicast data available to a wide array of users. The wide dissemination over a public network also places the data at risk for interception by unauthorized recipients Encryption was created for computers to move data in a secure fashion. Many different encryption formats have been used throughout the years. One problem however, is that encrypted data cannot be used by programs that do not possess the data key, and more importantly programs that do not posses the algorithm to de-crypt the data. An example of encryption at work is the Secure Sockets Layer of Transmission Control Protocol. This encryption scheme allows Internet browsers to exchange credit card information without being intercepted by hackers. The problem is that no Multicast programs support encrypted transmission. Therefore, there exists a need to allow the secure Multicast broadcasts.

SUMMARY OF THE INVENTION

The present invention comprises a system and method for sending a secure multicast transmission. The system includes a computer system coupled to a public network and configured to generate a multicast broadcast, and encrypt the generated multicast broadcast. The system also includes a router coupled to the public network, and a user system configured to request to join a multicast broadcast, wherein the user system is associated with the router. The router is configured to retrieve the encrypted multicast broadcast from the computer system over the public network, decrypt the sent multicast broadcast, and send the decrypted multicast broadcast to the user system requesting to join.

In accordance with further aspects of the invention, the computer system includes a router locally coupled to a multicast broadcast generating system. The multicast broadcast generating system attaches a local address to the generated multicast broadcast and sends the generated multicast broadcast with the local address to the router. The computer system router removes the local address, encrypts the sent multicast broadcast, and attaches a network multicast address to the encrypted multicast broadcast.

In accordance with other aspects of the invention, wherein a plurality of user systems are associated with the router.

As will be readily appreciated from the foregoing summary, the invention provides a technique for performing secure multicast transmissions.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Figure 1:
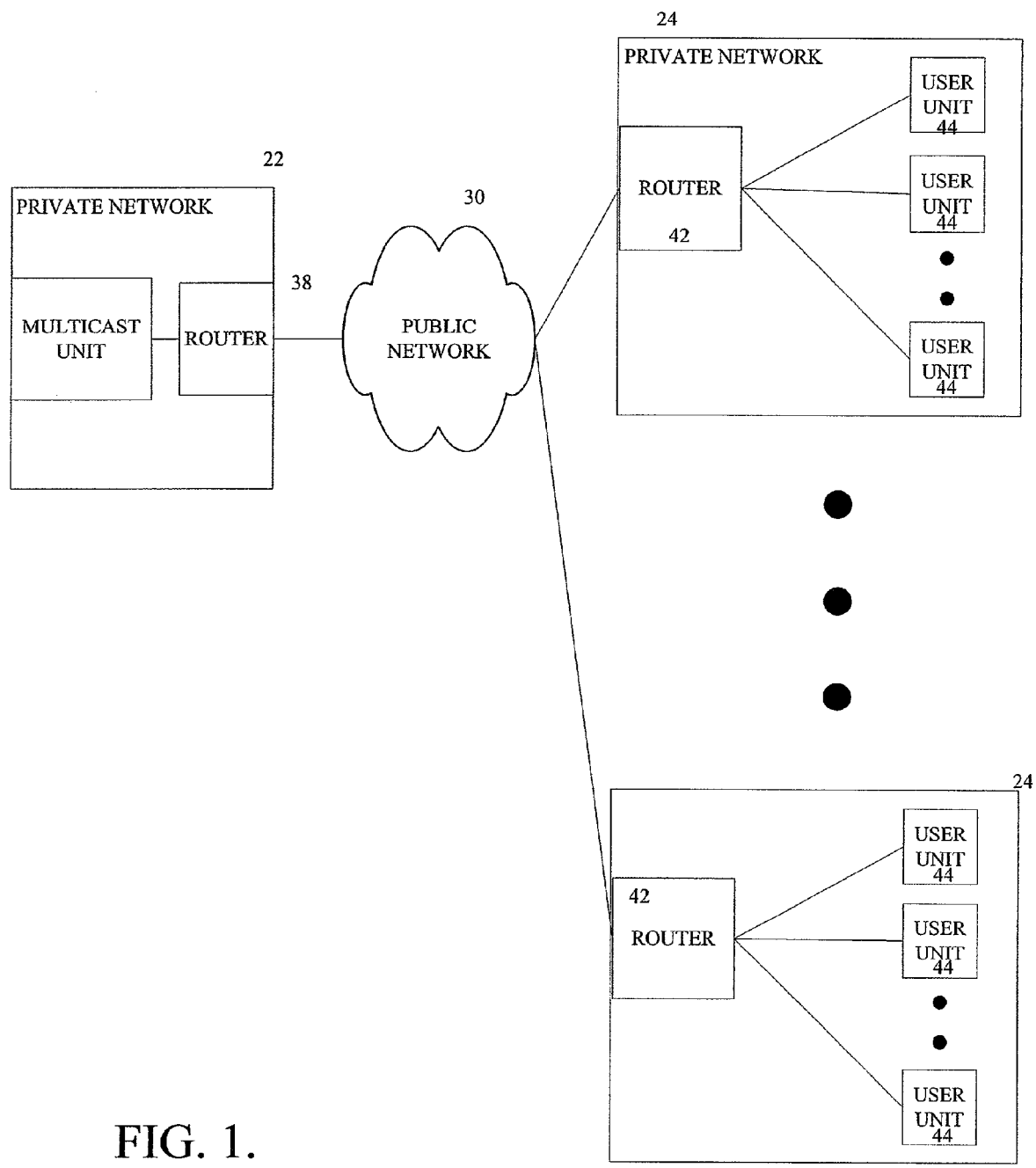
FIG. 1 is a block system diagram of the present invention.

As shown in FIG. 1 the present invention is a system 20 for performing secure transmission of multicast broadcasts. The system 20 includes a multicast private network 22, one or more multicast receiving private networks 24, and a public network 30. The private network 22 includes a multicast generating unit 36 coupled to a router 38. The router 38 is coupled to the public network 30. Each of the plurality of private networks 24 includes a router 42 that is coupled to the public network 30 and coupled to one or more user units 44. Examples of user units 44 are personal home computers, laptops, or any other computer processing device that allows wired or wireless connection to the public network 30 through the router 42 or Internet provider, such as AOL or AT&T.

The multicast private network's router 38 or some other computer device within the private network 22 receives a multicast broadcast from the multicast generating unit 36. An encryption application program executed on the multicast private network's router 38 or some other computer device within the private network 22 encrypts the received multicast broadcast for transmission to user units 44 that have requested the generated multicast broadcast. The router 42 of a receiving private network 24 retrieves the generated multicast encrypted broadcast, if a user unit 44 associated with the router 42 has requested to join the multicast broadcast. The retrieved multicast broadcast is decrypted by an application program executed on the router 42 or on some other computer device within the private network 24 and delivered to the requesting user unit 44. The method performed by the system 20 is described in more detail below in FIGS. 2A and 2B.

The present invention takes away the encryption and decryption steps from the end users and places that task to the nearest router. By performing the decryption at a router or Internet provider's server, associated with a large number of user systems, the encryption only needs to be performed once and not at every user system requesting to join the multicast broadcast.

Figure 2A:
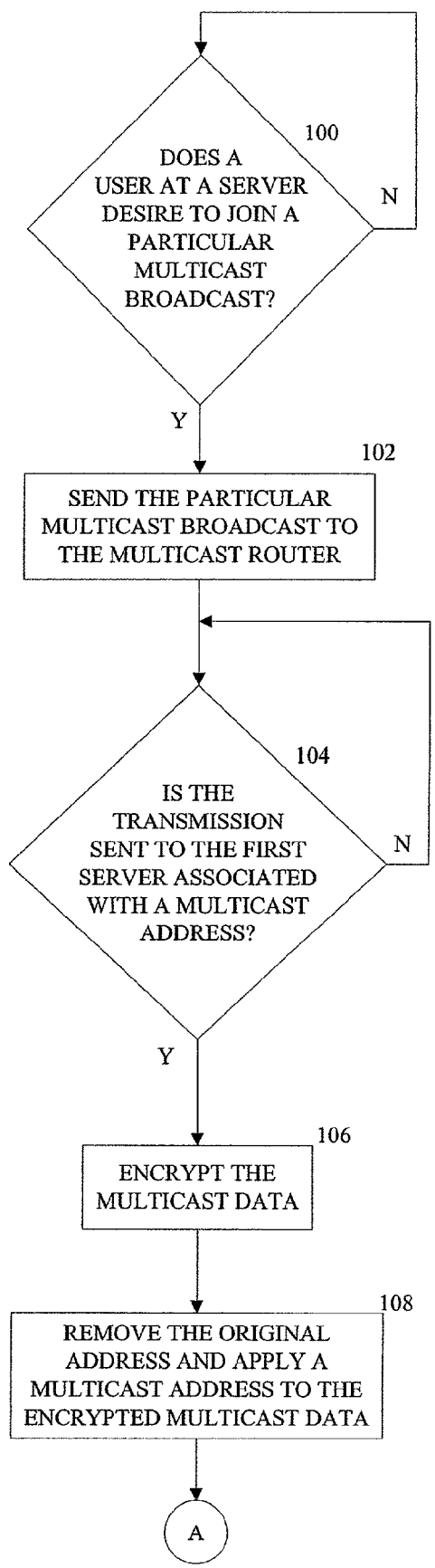
FIGS. 2A and B are flow diagrams performed by the system shown in FIG. 1.

As shown in FIG. 2A, the process of performing secure multicast transmission over a public network 30 is shown. First, at decision block 100, the process determines if a user at a receiving server system or public network 24 desires to join a particular multicast broadcast. If no request to join a multicast broadcast exists the system thus continues until a request to join does occur. If a request to join a multicast broadcast has occurred, the multicast generating unit 36 generates and sends a multicast broadcast to the router 38 using a local address, see block 102. The local address used is known by the router 38 to be associated with a multicast broadcast. Next, at decision block 104, the router 38 determines if the address associated with the generated multicast broadcast indicates the need to perform encoding of the multicast broadcast information. If the router 38 does not detect a multicast address associated with the received data, the process returns to checking if the local address of a data packet received from a connected unit is associated with a particular multicast address. However, if the transmission (packet) received by the router 38 has a local address associated with a multicast broadcast requiring encryption, the router 38 encrypts the multicast data included in the received transmission (packet), see block 106. It can be appreciated that various types of data encryption can occur, for example, secure socket layer encryption or other types of the encryption can be used.

Figure 2B:
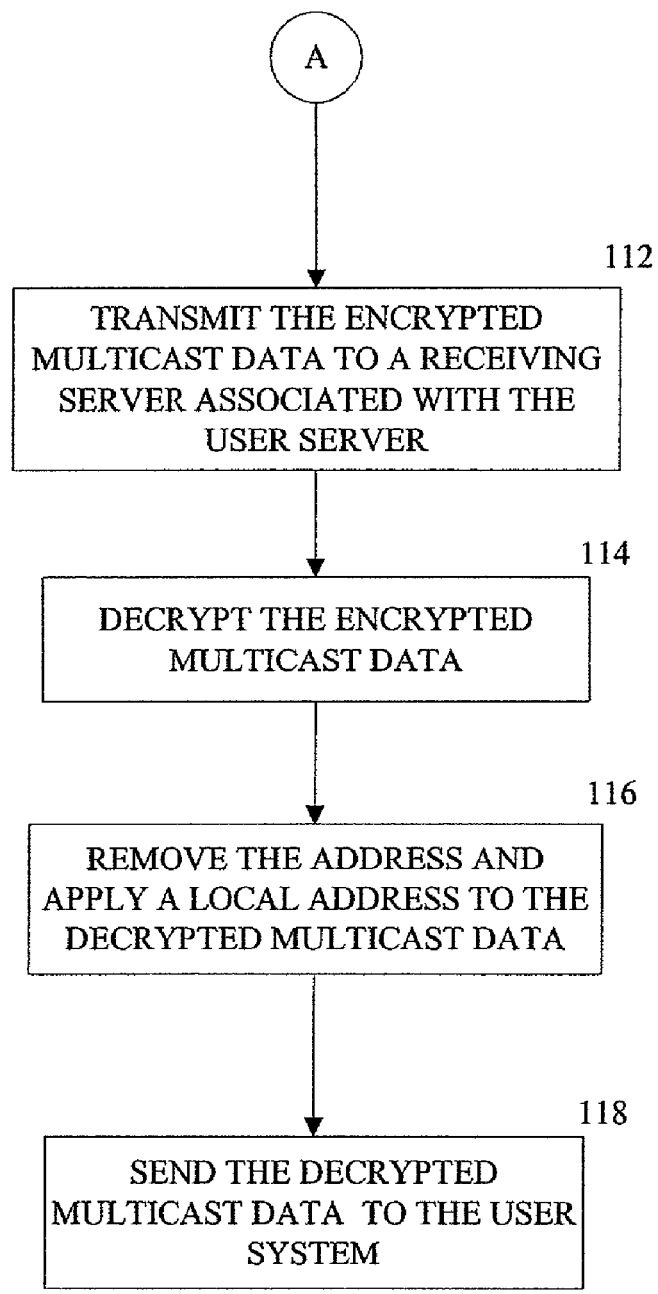
Figure 3:
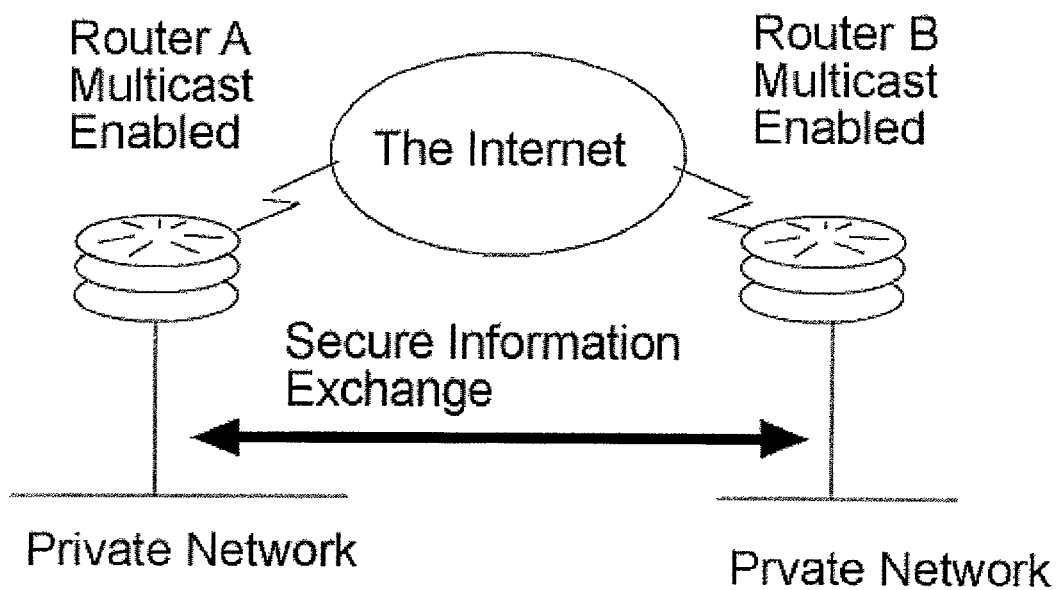
FIGS. 3-8 illustrate examples of the present invention.
Figure 4:
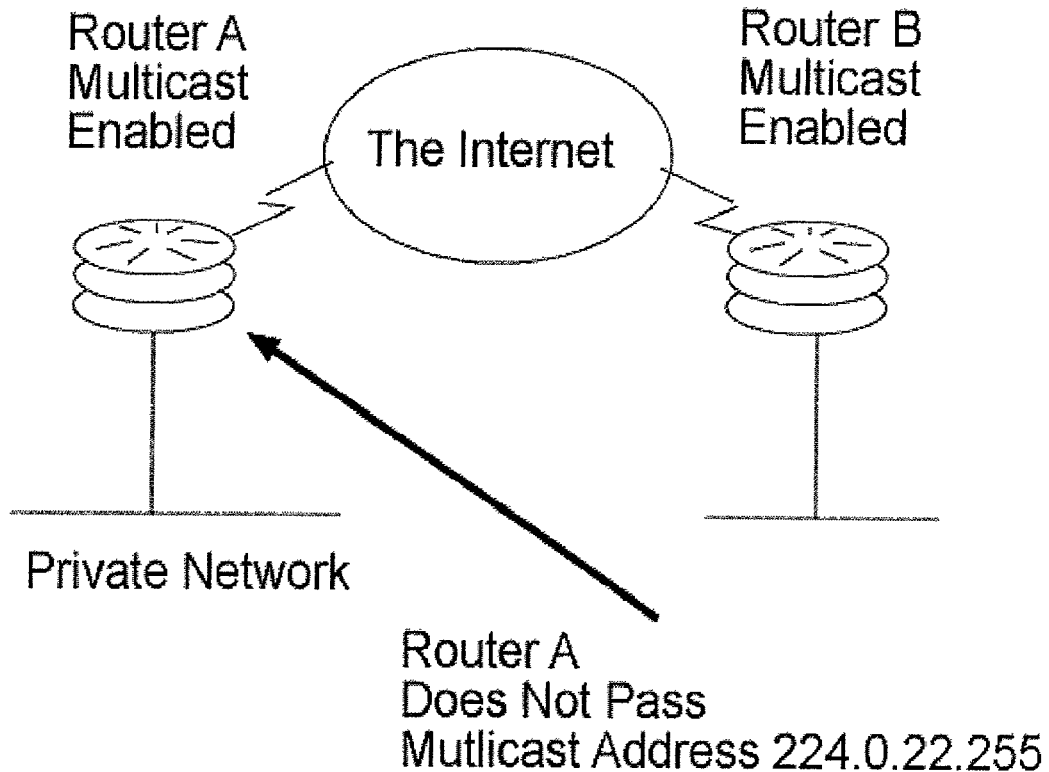
Figure 5:
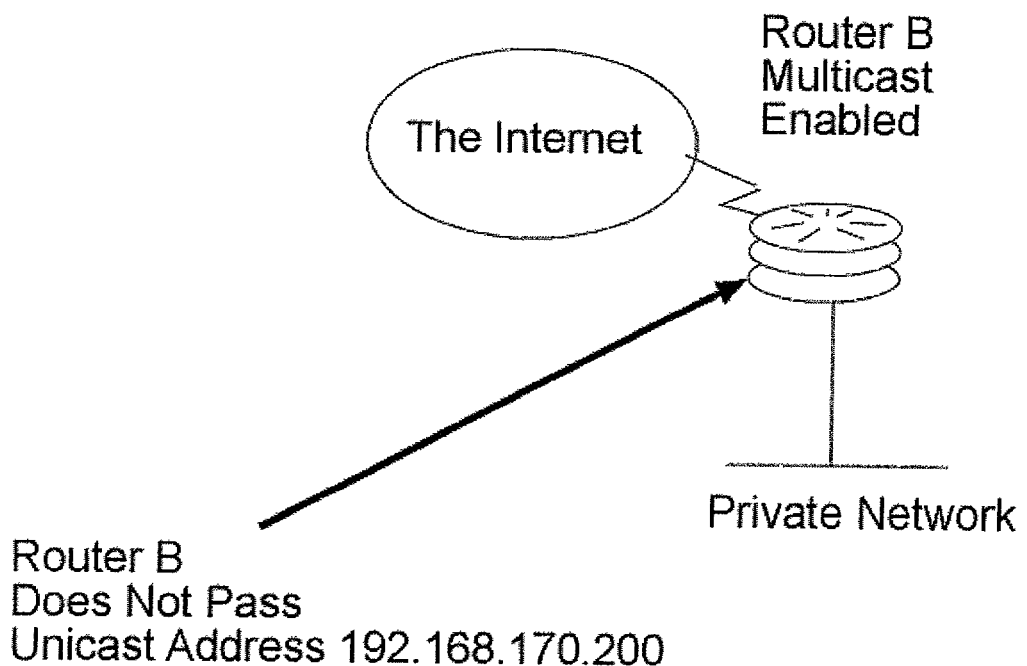
Figure 6:
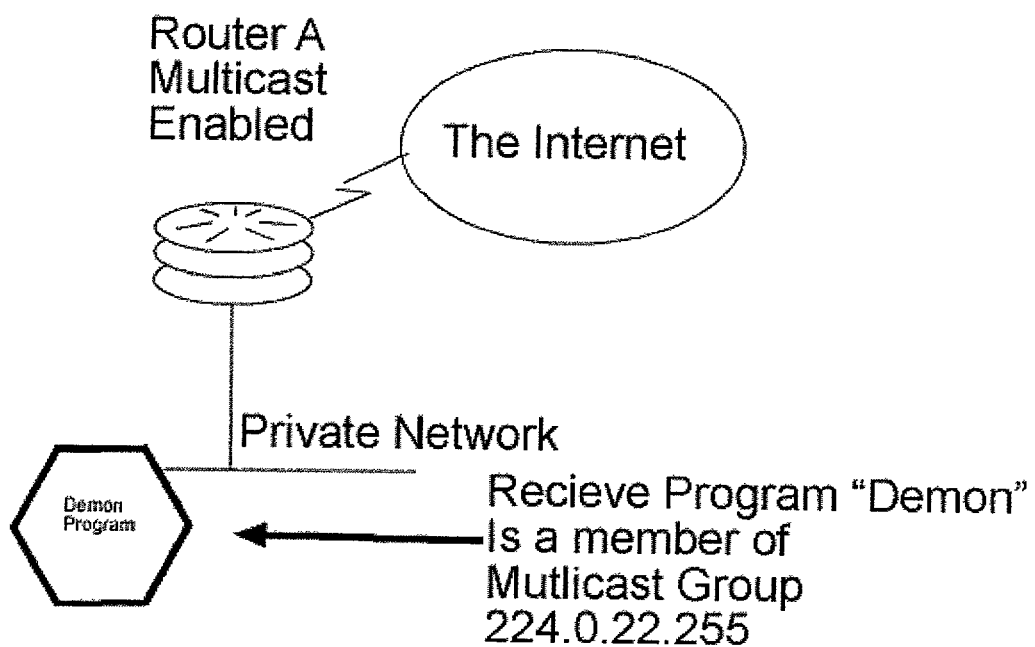
Figure 7:
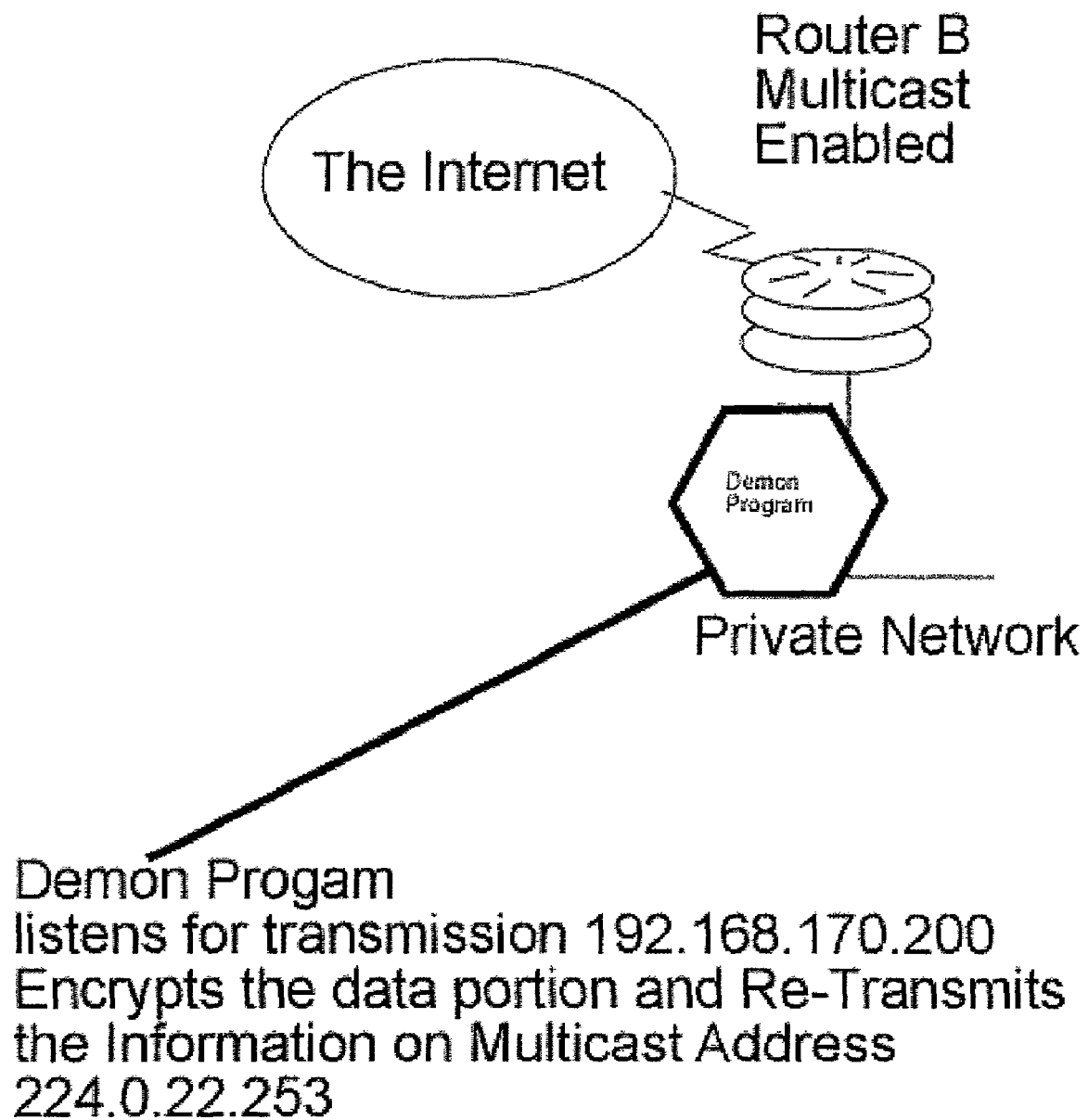
Figure 8:
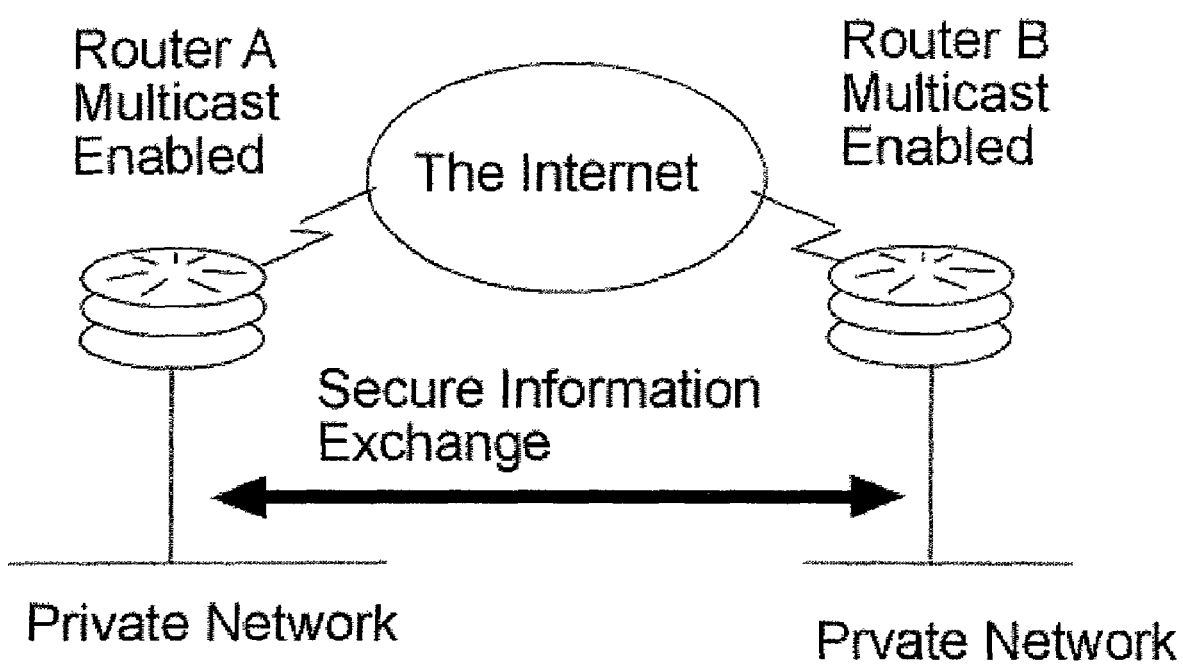

Next, at block 108, the original local address associated with the multicast broadcast sent to the router 38 is removed and a public multicast address is applied to the encrypted multicast data. Next, at block 112, as shown in FIG. 2B, the encrypted multicast data is transmitted to a receiving router 42 at a private network 24. The receiving router 42 is one which an associated user unit 44 has made a request to join a generated multicast broadcast. At block 114, the receiving router 42 decrypts the encrypted multicast data and, at block 116, the router 42 also removes the address associated with the received encrypted multicast data and applies a address local to the receiving private network 24. Finally, at block 118, the decrypted data is sent to the user unit 44 that requested to join the multicast broadcast according to the applied local address.

EXAMPLE

The following refers to FIGS. 3-8. A data stream is first broadcast over on a private network on unicast private address 192.168.170.200 network address 192.168.170.1/24. See FIG. 7. A transmission program is watching for address 192.168.170.200 and a gateway router has been programmed to not forward to private network 192.168.170.1/24. See FIG. 5. When the packet/data stream on address 192.168.170.200 is spotted, it is placed into a buffer where the data portion of the packet is stripped. Then the data portion is encrypted and reaffixed to a Multicast packet header. The packet is then retransmitted on Multicast address 224.0.22.253. See FIG. 7. The retransmitted information is routed to the public Internet, or broadcast on the airwaves, satellite, etc. See FIG. 8. The system that receives the retransmitted information has private network 192.168.171.1/24. The gateway router on this private network is programmed to receive multicast groups. See FIG. 4. The gateway router does not repeat a private Multicast Address 224.0.22.254 (note the address is different than the one specified above). The program at the receiving system requests a multicast join toward the rendezvous point at the source router. The rendezvous point is configured with the multicast address 224.0.22.254. A program on the receiving side is continuously joined to Secure Multicast 224.0.22.253 and the data is stripped away from the packet 224.0.22.253 decrypted and retransmitted on Multicast address 224.0.22.254 thus the Multicast Join is satisfied within the network and the requesting program sees it as any other Multicast. See FIG. 6.

While the preferred embodiment of the invention has been illustrated and described, as noted above, many changes can be made without departing from the spirit and scope of the invention. Accordingly, the scope of the invention is not limited by the disclosure of the preferred embodiment.

The embodiments of the invention in which an exclusive property or privilege is claimed are defined as follows:

1. A method for performing a secure multicast broadcast at a router for keeping unauthorized entities from gaining access to the secure multicast broadcast, the method comprising:
    sending a received request to join a multicast broadcast at a user system to an Internet Protocol (IP) multicast address;
    determining if the multicast address of the request to join is associated with a multicast broadcast IP address based on one of a table or map;
    receiving a multicast transmission from a first computer system associated with the multicast address, wherein the received multicast transmission is encrypted,
    if the request to join is associated with a multicast broadcast address, then
        removing the multicast broadcast IP address;
        decrypting the sent multicast broadcast;
        attaching one of an associated or a local IP multicast address to the decrypted multicast broadcast; and
        sending the multicast broadcast to the user system requesting to join, thereby keeping unauthorized entities from gaining access to the secure multicast broadcast because knowledge of the attached associated or a local IP multicast address is only previously know to the first computer system and the user system.

2. A router for sending a secure multicast broadcast so that unauthorized entities cannot gain access to the secure multicast broadcast, the router comprising:
    a computer device configured to:
        send a received request to join a multicast broadcast at a user system to an Internet Protocol (IP) multicast address;
        determine if the multicast address of the request to join is associated with a multicast broadcast IP address;
        receive a multicast transmission from a first computer system associated with the multicast address, wherein the received multicast transmission is encrypted,
        if the request to join is associated with a multicast broadcast address, then remove the multicast broadcast IP address;
        decrypt the sent multicast broadcast;
        attach one of an associated or a local IP multicast address to the decrypted multicast broadcast; and
        send the multicast broadcast to the user system requesting to join, thereby keeping unauthorized entities from gaining access to the secure multicast broadcast because knowledge of the attached associated or a local IP multicast address is only previously know to the first computer system and the user system.

3. A router for sending a secure multicast broadcast so that unauthorized entities cannot gain access to the secure multicast broadcast, the router comprising:
    a computer device configured to:
        send a received request to join a multicast broadcast at a user system to an Internet Protocol (IP) multicast address;
        determine if the multicast address of the request to join is associated with a multicast broadcast IP address;
        receive a multicast transmission from a first computer system associated with the multicast address, wherein the received multicast transmission is encrypted,
        if the request to join is associated with a multicast broadcast address, then
        remove the multicast broadcast IP address;
        decrypt the sent multicast broadcast;
        attach one of an associated or a local IP multicast address to the decrypted multicast broadcast; and
        send the multicast broadcast to the user system requesting to join, thereby keeping unauthorized entities from gaining access to the secure multicast broadcast because knowledge of the attached associated or a local IP multicast address is only previously know to the router.

* * * * *

UNITED STATES PATENT AND TRADEMARK OFFICE
CERTIFICATE OF CORRECTION

| | | |
|---|---|---|
| PATENT NO. | : 7,673,136 B2 | Page 1 of 1 |
| APPLICATION NO. | : 10/085524 | |
| DATED | : March 2, 2010 | |
| INVENTOR(S) | : Ian A. Stewart | |

It is certified that error appears in the above-identified patent and that said Letters Patent is hereby corrected as shown below:

In Column 4, Lines 40 and 65, please change the word know to --known--

Signed and Sealed this

Thirteenth Day of July, 2010

David J. Kappos
*Director of the United States Patent and Trademark Office*